United States Patent
Saikawa et al.

(10) Patent No.: US 7,020,331 B2
(45) Date of Patent: Mar. 28, 2006

(54) COLOR REPRODUCING SYSTEM CAPABLE OF PERFORMING SELECTION ABOUT WHETHER OR NOT PREDETERMINED PROCESSING IS PERFORMED ON COLOR IMAGE DATA

(75) Inventors: Haruko Saikawa, Ojiya (JP); Kensuke Ishii, Tokyo (JP); Yasuhiro Komiya, Hino (JP); Kenro Ohsawa, Musashino (JP); Toru Wada, Niiza (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/885,375

(22) Filed: Jul. 6, 2004

(65) Prior Publication Data
US 2004/0240728 A1    Dec. 2, 2004

Related U.S. Application Data

(62) Division of application No. 09/630,041, filed on Aug. 1, 2000, now Pat. No. 6,766,050.

(30) Foreign Application Priority Data
Aug. 3, 1999   (JP)   ................................. 11-219922

(51) Int. Cl.
G06K 9/00   (2006.01)
(52) U.S. Cl. ........................................ 382/167; 382/164
(58) Field of Classification Search ................ 382/162, 382/164, 165, 167, 305; 358/509, 515, 518, 358/520, 523, 527; 348/188, 207, 220.1, 348/221.1, 223.1, 231; 386/46, 117; 396/63; 355/77
See application file for complete search history.

(56) References Cited

U.S. PATENT DOCUMENTS

| | | | |
|---|---|---|---|
| 5,132,786 A | | 7/1992 | Ishiwata |
| 5,223,891 A | * | 6/1993 | Fierstein et al. ............... 355/77 |
| 5,414,537 A | * | 5/1995 | Omuro et al. ............... 358/518 |
| 5,453,853 A | * | 9/1995 | Sakai et al. ................. 358/518 |
| 5,638,184 A | | 6/1997 | Fujimoto et al. |
| 5,742,339 A | | 4/1998 | Wakui |
| 5,828,780 A | | 10/1998 | Suzuki et al. |
| 5,852,675 A | * | 12/1998 | Matsuo et al. .............. 382/167 |
| 6,111,605 A | | 8/2000 | Suzuki |
| 6,211,973 B1 | * | 4/2001 | Takemoto ................... 358/515 |
| 6,249,313 B1 | | 6/2001 | Nishi |
| 6,253,023 B1 | | 6/2001 | Fukushima et al. |

(Continued)

FOREIGN PATENT DOCUMENTS

JP   10-285541   10/1998

(Continued)

*Primary Examiner*—Andrew W. Johns
*Assistant Examiner*—Amir Alavi
(74) *Attorney, Agent, or Firm*—Straub and Pokotylo; John C. Pokotylo (57) ABSTRACT

A color reproducing system includes a color image input section. A color image processing device has an image processing section for performing a predetermined processing on color image data input through the color image input section. A storage section stores therein the color image data which has been input through the color image input section. A color image output section outputs the color image data which has been stored in the storage section. The color image processing device further includes a processing selection section for performing selection about whether or not the predetermined processing is performed on the color image data input through the color image input section.

9 Claims, 5 Drawing Sheets

U.S. PATENT DOCUMENTS

| | | |
|---|---|---|
| 6,256,062 B1 * | 7/2001 | Endo ........................ 348/223.1 |
| 6,426,771 B1 | 7/2002 | Kosugi |
| 6,449,426 B1 | 9/2002 | Suga et al. |
| 6,539,169 B1 | 3/2003 | Tsubaki et al. |
| 6,549,232 B1 | 4/2003 | Taniguchi et al. |
| 6,549,653 B1 | 4/2003 | Osawa et al. |
| 6,618,079 B1 * | 9/2003 | Higuchi ..................... 348/223.1 |
| 6,628,826 B1 * | 9/2003 | Gilman et al. ............... 382/167 |
| 6,734,899 B1 * | 5/2004 | Okamoto .................... 348/188 |
| 6,766,050 B1 * | 7/2004 | Saikawa et al. ............. 382/162 |

FOREIGN PATENT DOCUMENTS

| | | |
|---|---|---|
| JP | 11-85952 | 3/1999 |
| JP | 11-96333 | 4/1999 |

\* cited by examiner

COLOR REPRODUCING SYSTEM CAPABLE OF PERFORMING SELECTION ABOUT WHETHER OR NOT PREDETERMINED PROCESSING IS PERFORMED ON COLOR IMAGE DATA

CROSS-REFERENCE TO RELATED APPLICATIONS

This application is a divisional of prior application Ser. No. 09/630,041, titled "COLOR REPRODUCING SYSTEM CAPABLE OF PERFORMING SELECTION ABOUT WHETHER OR NOT PREDETERMINED PROCESSING IS PERFORMED ON COLOR IMAGE DATA", now U.S. Pat. No. 6,766,050 filed on Aug. 1, 2000 and listing Haruko Saikawa, Kensuke Ishii, Yasuhiro Komiya, Kenro Ohsawa, and Toru Wada as inventors, (incorporated herein by reference) which is based upon and which claims the benefit of priority from the prior Japanese Patent Application No. 11-219922, filed Aug. 3, 1999, the entire contents of which applications are incorporated herein by reference.

BACKGROUND OF THE INVENTION

The present invention relates to a color reproducing system, and in particular to a color reproducing system for reproducing color of a subject image which has been photographed by a color image input device such as a digital camera or the like by a color image output device such as a monitor, a printer or the like.

Many of conventional color reproducing systems aim to reproduce color appearing desirably, while exact color reproduction is basically achieved to some extent in such an image which has been photographed by a digital camera. For this reason, since color image processing is automatically performed inside a camera, a user can obtain an image satisfying him/her to some extent without adjusting an output image.

On the other hand, Japanese Patent Application KOKAI Publication No. 11-85952 has disclosed a color reproducing system aiming to achieve exact color reproduction, where an XYZ image of a subject under observation illumination light on a reproduction side is obtained from a photographed image of the subject, using the spectral sensitivity of a camera, photographing illumination light spectral data on a photograph side, observation illumination light spectral data on the reproducing side, and the like, and the XYZ image is converted to signal values in a reproducing device in response to color reproduction characteristics of a reproducing device to be output.

Also, in Japanese Patent Application KOKAI Publication No. 11-96333, a method has been disclosed that an exact color reproduction is performed by photographing a color chart whose spectral reflectance is known in the same conditions as photographing in a subject and using the spectral reflectance of the color chart and the photographing signal, even when there is neither spectral sensitivity of a camera nor photographing illumination light spectral data. In these methods, it is required that the photographed image of the subject is modeled by wavelength integral of a product of the spectral sensitivity of the camera and the incident light spectrum of the subject to the camera. Or it is required to be calibrated to such data.

In Japanese Patent Application KOKAI Publication No. 10-285541, when image data is recorded in a recording medium (memory card) of an electric still camera, image processing information such as white balance or gamma correction which has been performed on photographed image data in addition to the photographed image data is recorded simultaneously therewith, and restoring processing is performed according to procedure reversed to the image processing when exact color reproduction is performed so that image signal before the image processing is obtained and image correction processing is performed in accordance with displaying characteristics of a displaying monitor device.

In an exact color reproducing system such as disclosed in Japanese Patent Application KOKAI Publication No. 11-85952 and No. 11-96333, as mentioned above, it is necessary to perform a processing for color reproduction on photographed image data on which such an image processing as a contour enhancement or the like has not been performed. Also, in order to perform exact color reproduction, data of the spectral sensitivity of a camera, photographing illumination light spectrum, observation illumination light spectrum and the like are required, and these data corresponding to photographed image data must be used in the color reproduction processing.

Also, the method which has been disclosed in Japanese Patent Application KOKAI Publication No. 10-285541 is structured such that, after image data has been subjected to such an image processing as white balance or shading processing, gamma correction and the like, it is recorded in a memory card and it is subjected to restoring process according to the procedure reversed to the recording procedure in recording/restoring processing of the image data, so that photographed image data which has not been subjected to the image processing is obtained. However, such an image processing as white balance, gamma correction or the like is not required for image processing for exact color reproduction originally, and a processing which makes it impossible to restore image data is performed in some cases. Also, it is a complicated task to cause various pieces of data required for color reproduction to correspond to image data pieces different in photographing conditions, and there often occurs a case where data correspondence can not be preformed exactly.

Accordingly, an object of the present invention is to provide a color reproducing system which can make selection about whether or not predetermined image processing is performed on input color image data according to an aspect of a color reproduction processing.

BRIEF SUMMARY OF THE INVENTION

In order to achieve the above object, the present invention is a color reproducing system comprising:
a color image input section;
a color image processing device having an image processing section for performing a predetermined processing on color image data input through the color image input section;
a storage section for storing the color image data input through the color image input section; and
a color image output section for outputting the color image data stored in the storage section, wherein
the color image processing device further comprises a processing selection section for selecting whether or not the predetermined processing is performed on the color image data input through the color image input section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be explained in detail below with reference to the drawings.

(First Embodiment)

Figure 1:
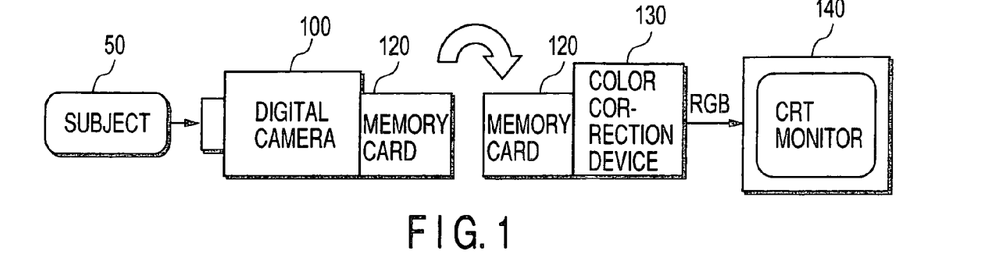
FIG. 1 is a diagram showing a configuration of a color reproducing system according to a first embodiment of the present invention.
Figure 2:
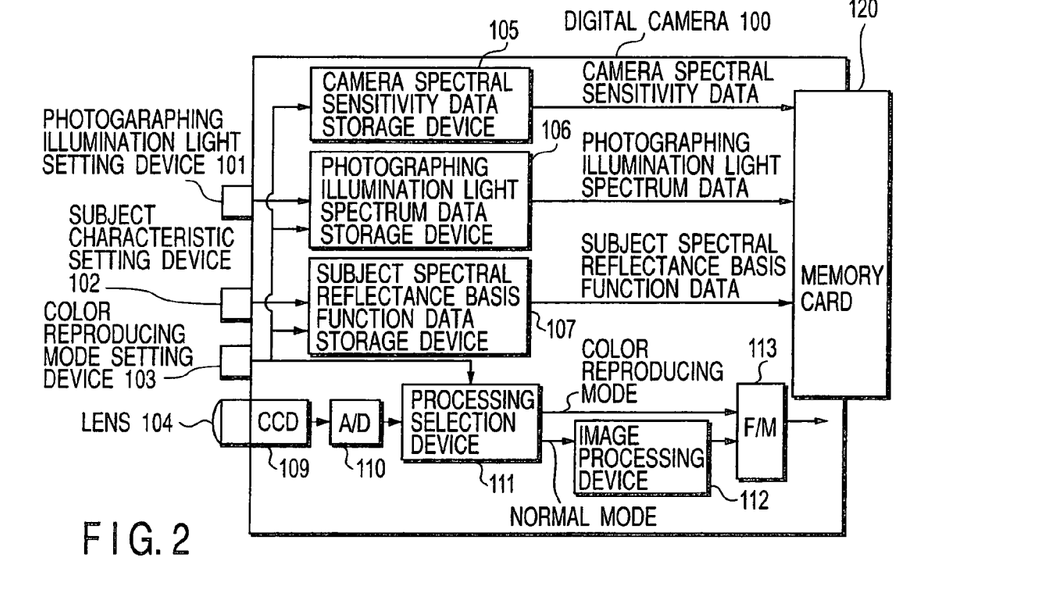
FIG. 2 is a diagram showing a configuration of a digital camera shown in FIG. 1.
Figure 3:
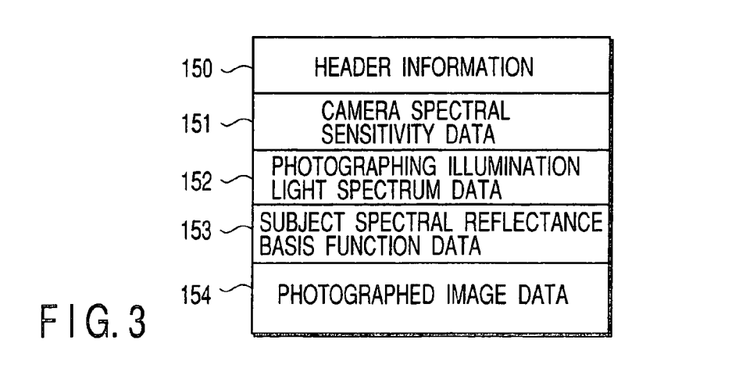
FIG. 3 is a diagram showing a data structure of a memory card.

FIGS. 1 to 3 show a first embodiment of a color reproducing system of the present invention. As shown in FIG. 1, the color reproducing system of this embodiment comprises a digital camera 100, a memory card 120, a color correction device 130, and a CRT monitor 140. Photographed image data which is color image data of a subject 50 which has been photographed by the digital camera 100 is stored in the memory card 120 which has been inserted in a camera main body prior to photographing.

FIG. 2 shows a configuration of the digital camera 100. A subject image is formed on a CCD 109 through a lens 104, and after an analog signal which has been output from the CCD 109 is digitized through an A/D converter (A/D) 110, the digitized signal is input into a processing selection device 111 as photographed image data. In the processing selection device 111, selection of processing is performed on the basis of data regarding mode setting from a color reproducing mode setting device 103. Set mode comprises a color reproducing mode and a normal mode. The color reproducing mode is for exact color reproduction, while the normal mode is for a desirable color reproduction which has been set in advance.

When the set mode is the normal mode, after a predetermined image processing is performed on photographed image data in the image processing device 112, it is stored in a memory card 120 through a frame memory (F/M) 113. The predetermined image processing performed in the image processing device 112 includes white balance, edge enhancement, saturation enhancement, and gamma correction in order to perform desirable color reproduction.

Also, when the set mode is the color reproducing mode, the photographed image data is stored in the memory card 120 through the frame memory 113 without performing the processing on the data in the image processing device 112.

Also, camera spectral sensitivity data, photographing illumination light spectrum data which is photographing illumination light information, and subject spectral reflectance basis function data which is spectral characteristic information are respectively read out from a camera spectral sensitivity data storage device 105, from photographing illumination light spectrum data storage device 106, and from a subject spectral reflectance basis function data storage device 107 to be recorded in the memory card 120. Here, the photographing illumination light spectrum data is one which has been set by a photographing illumination light setting device 101 in advance by selection from a plurality of pieces of illumination light spectrum data which have been stored in the photographing illumination light spectrum data storage device 106.

The photographing illumination light spectrum data which has been stored in the photographing illumination light spectrum data storage device 106 is spectrum measurement data of a plurality of light sources including a daylight lamp, a fluorescent lamp, a halogen lamp, and the like. Similarly, the subject spectral reflectance basis function data is one which has been selected from a plurality of pieces of subject spectral reflectance basis function data which have been stored in the subject spectral reflectance basis function data storage device 107 and has been set by a subject characteristic setting device 102 in advance. The subject spectral reflectance basis function data which has been stored in the subject spectral reflectance basis function data storage device 107 is basis function data of spectral reflectances of a plurality of subjects including a human skin, a color chart, a flower, a picture and the like.

When the set mode is the normal mode, photographed image data and related information required according to formats such as data size of image are stored in the memory card 120 in a predetermined format. Also, when the set mode is the color reproducing mode, header information 150, camera spectral sensitivity data 151, photographing illumination light spectrum data 152, and subject spectral reflectance basis function data 153 are stored together with photographed image data 154 in the memory card 120 for each photographed image, as shown in FIG. 3.

In the color correction device 130, XYZ under observation illumination light is estimated from the photographed image data, the photographing illumination light spectrum data, and the subject spectral reflectance basis function data which are read out from the memory card 120, and observation illumination light spectrum data which is observation illumination light information and color matching function data which have been stored in the color correction device 130 in advance, and RGB signal to be input in the CRT monitor 140 is calculated from the estimated XYZ and CRT monitor profile data to be output in the CRT monitor 140 in order to display the XYZ of the subject under the observation illumination light on the CRT monitor 140.

The CRT monitor 140 is input with the RGB signal output form the color correction device 130 to display photographed image data of the subject 50. Incidentally, all the spectral characteristic data has data at intervals of 1 nm in a wavelength range of 380 nm to 780 nm. The configuration and operation of the color correction device 130 have been described in detail in Japanese Patent Application KOKAI Publication No. 11-85952 and therefore explanation thereof will be omitted here.

(Second Embodiment)

Figure 4:
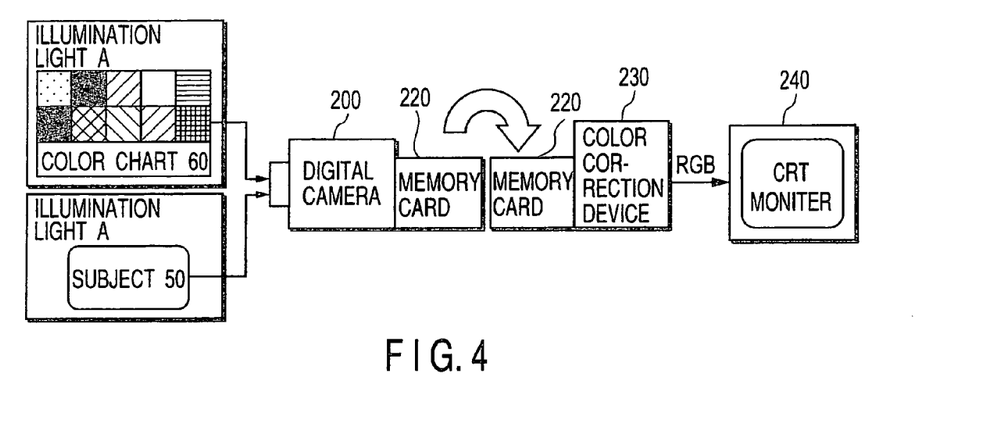
FIG. 4 is a diagram showing a configuration of a color reproducing system according to a second embodiment of the invention.

FIGS. 4 to 7B show a second embodiment of a color reproducing system of the invention. As shown in FIG. 4, the color reproducing system of this embodiment comprises a color chart 60 for calibration, a digital camera 200, a memory card 220, a color correction device 230, and a CRT monitor 240. Photographed image data of a subject 50 which has been photographed by the digital camera 200 is stored in the memory card 220 which has been inserted in a camera body prior to photographing.

Figure 5:
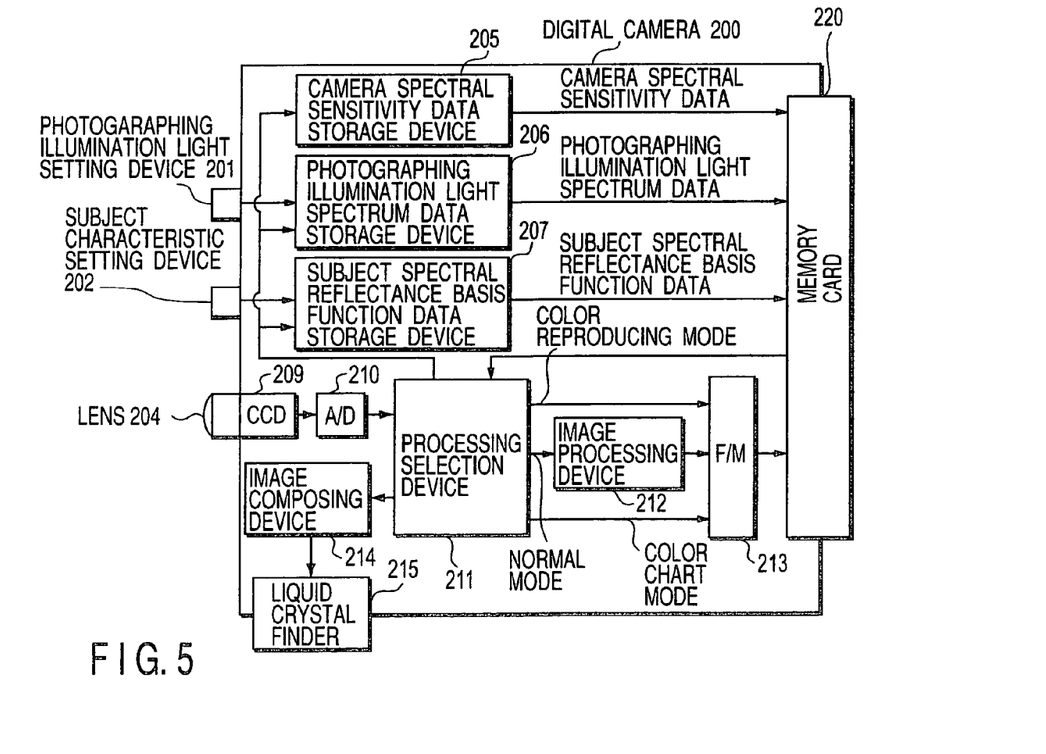
FIG. 5 is a diagram showing a configuration of a digital camera shown in FIG. 4.

FIG. 5 shows a configuration of the digital camera 200. A subject image is formed on a CCD 209 through a lens 204, and, after an analog signal output from the CCD 209 is digitized through an A/D converter (A/D) 210, it is input in a processing selection device 211 as photographed image data.

In the processing selection device 211, selection of processing is performed on the basis of data regarding mode setting which has been stored in the memory card 220. Set mode comprises a color reproducing mode, a normal mode, and a color chart mode. The color reproducing mode is for exact color reproduction and the normal mode is for desirable color reproduction which has been set in advance. Also, the color chart mode is setting for acquiring calibration data for photographing illumination light and the camera spectral sensitivity, and, after photographing a subject in the color reproducing mode, the mode is automatically changed to the color chart mode.

When the set mode is the normal mode, after a predetermined image processing is performed on photographed image data in the image processing device 212, the processed image data is stored in the memory card 220 through a frame memory (F/M) 213. The predetermined image processing performed in the image processing device 212 includes white balance, edge enhancement, saturation enhancement, and gamma correction.

Also, when the set mode is the color reproducing mode, the photographed image data is stored in the memory card 220 through the frame memory 213 without performing the processing on the data in the image processing device 212.

Also, camera spectral sensitivity data, photographing illumination light spectrum data which is photographing illumination light information, and subject spectral reflectance basis function data which is spectral characteristic information are respectively read out from a camera spectral sensitivity data storage device 205, from a photographing illumination light spectrum data storage device 206, and from a subject spectral reflectance basis function data storage device 207 so that they are stored in the memory card 220. Here, the photographing illumination light spectrum data is one which has been set by a photographing illumination light setting device 201 in advance through selection from a plurality of pieces of illumination light spectrum data which have been stored in the photographing illumination light spectrum data storage device 206.

The photographing illumination light spectrum data which has been stored in the photographing illumination light spectrum data storage device 206 is spectrum measurement data of a plurality of light sources including a daylight lamp, a fluorescent lamp, a halogen lamp, and the like. Similarly, the subject spectral reflectance basis function data is one which has been set from a plurality of pieces of subject spectral reflectance basis function data which have been stored in the subject spectral reflectance basis function data storage device 207 by a subject characteristic setting device 202 in advance. The subject spectral reflectance basis function data which has been stored in the subject spectral reflectance basis function data storage device 207 is basis function data of spectral reflectances of a plurality of subjects including a human skin, a color chart, a flower, a picture and the like.

The subject spectral reflectance basis function data which is stored in the memory card 220 may be stored in the memory card 220 before the memory card 220 is inserted in the digital camera 200. In this case, the subject spectral reflectance basis function data which has been stored in the memory card 220 may be only data of a specific subject to be photographed corresponding to the kind of a subject or data about a plurality of kinds of subjects to be photographed. When the subject spectral reflectance basis function data of the specific subject has been stored in the memory card, the memory card is used as a dedicated memory card corresponding to the kind of the subject spectral reflectance basis function data which has been stored.

Figure 6A:
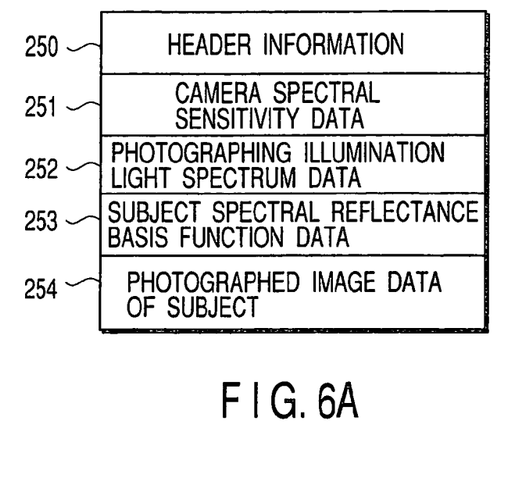
FIG. 6A is a diagram showing a data structure of a memory card in a color reproducing mode.

When the set mode is the normal mode, photographed image data and related information required according to formats such as data size of image are stored in the memory card 220 in a predetermined format. On the other hand, when the set mode is the color reproducing mode, header information 250, camera spectral sensitivity data 251, photographing illumination light spectrum data 252, and subject spectral reflectance basis function data 253 are stored together with photographed image data 254 in the memory card 220 for each photographed image, as shown in FIG. 6A. When the camera spectral sensitivity data, the photographing illumination light spectrum data and the subject spectral reflectance basis function data are not set, these data are not stored in the memory card 220.

Figure 7A:
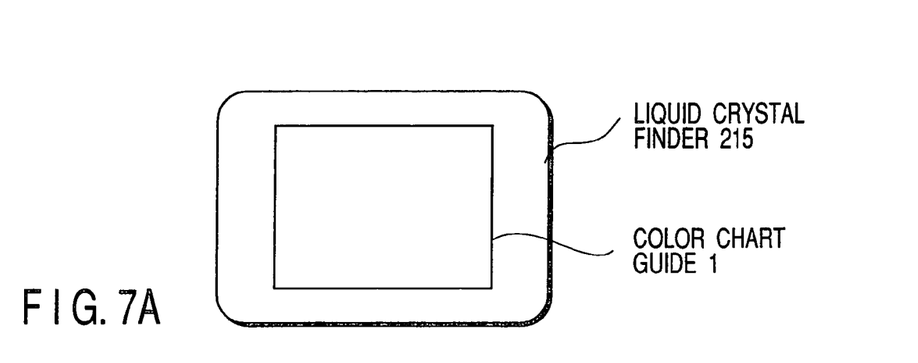
FIGS. 7A and 7B are diagrams each showing an aspect where a color chart guide corresponding to a configuration of a color chart is superimposed and displayed on a subject image when a set mode is a color chart mode.
Figure 7B:
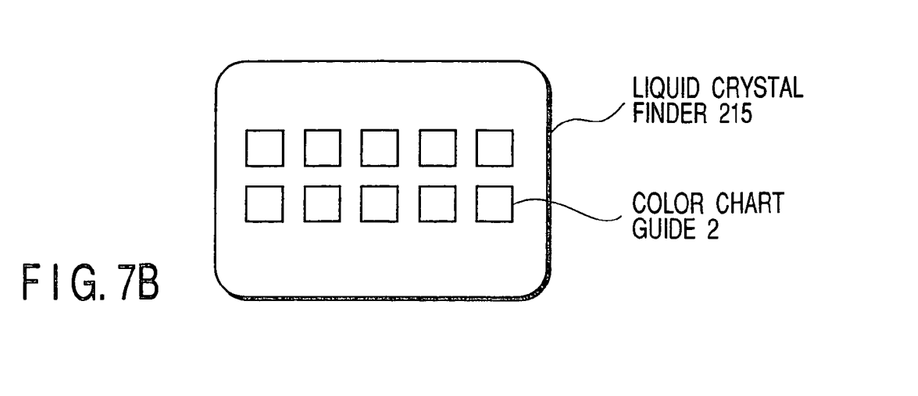
Figure 8A:
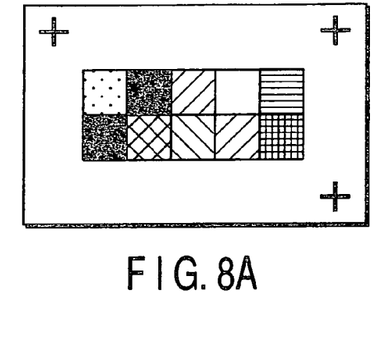
FIGS. 8A to 8G are diagrams each showing a configuration of a color chart.
Figure 8B:
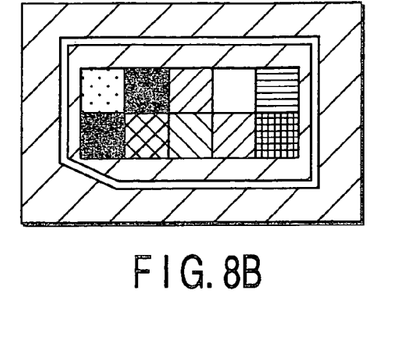
Figure 8C:
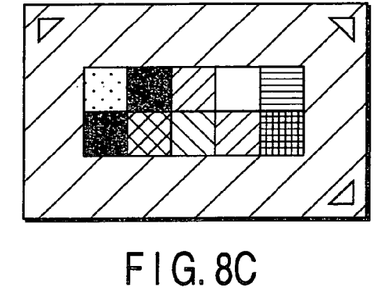
Figure 8D:
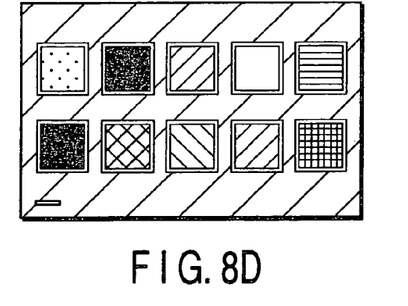
Figure 8E:
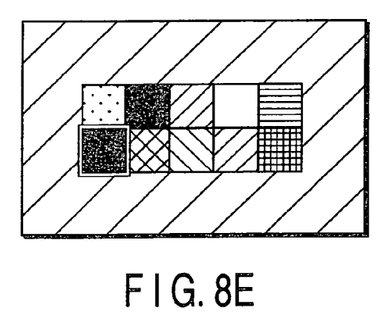
Figure 8F:
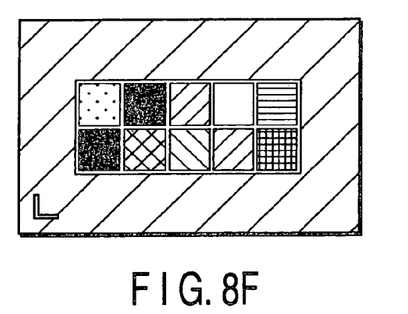
Figure 8G:
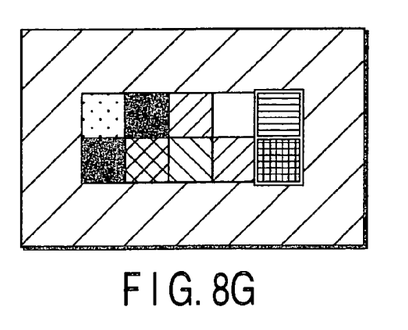

When the set mode is the color chart mode, as shown in FIGS. 7A and 7B, a color chart guide (a color chart guide 1 in FIG. 7A and a color chart guide 2 in FIG. 7B) corresponding to a configuration of a color chart is superimposed on the photographed image data to be displayed on a liquid crystal finder 215.

FIGS. 8A to 8G show examples of the color chart.

Figure 6B:
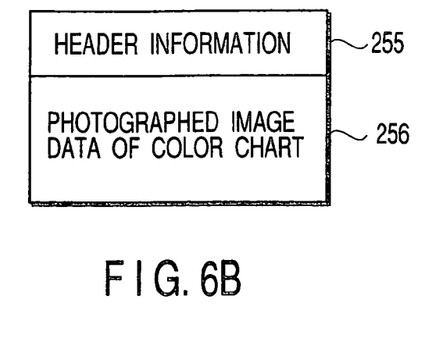
FIG. 6B is a diagram showing a data structure of a memory card in a color chart mode.

The photographed image data of the color chart at a time of the color chart mode is stored in the memory card 220 through the frame memory (F/M) 213 without processing the data in the image processing device 212. FIG. 6B shows a structure of data which is stored in the memory card 222 at the time of the color chart mode.

In the color correction device 230, XYZ under observation illumination light is estimated from the photographed image data, the photographing illumination light spectrum data, and the subject spectral reflectance basis function data which are read out from the memory card 220, and observation illumination light spectrum data which is observation illumination light information and color matching function data which have been stored in the color correction device 230 in advance, and RGB signal to be input in the CRT monitor 240 is calculated from the estimated XYZ and CRT monitor profile data to be output in the CRT monitor 240 in order to display the XYZ of the subject under the observation illumination light on the CRT monitor 240. The CRT monitor 240 is input with the RGB signal output form the color correction device 230 to display a color image of the subject. Incidentally, all the spectral characteristic data have data at intervals of 1 nm in the wavelength range of 380 nm to 780 nm.

The configuration and operation of the color correction device 230 have been described in detail in Japanese Patent Application KOKAI Publication No. 11-85952 and therefore explanation thereof will be omitted here.

Also, when at least one of camera spectral sensitivity and photographing illumination light spectrum is not stored in a photographed image data file, the photographed image data of the color chart 60 and the spectral reflectance of the color chart which has been stored in the color correction device 230 can be used in a substituting manner. Respective patches on the color chart 60 are recognized automatically as the image data of the color chart 60 and an average value of photographing signals of the respective patches is calculated in the color correction device 230. The file of the image data of the color chart 60 and the file of the photographed image data of the subject can be caused to correspond to each other by photographing numbers which have been stored in respective header information. Since the configuration and operation of the color correction device 230 in this case have been described in detail in Japanese Patent Application KOKAI Publication No. 11-96333, explanation thereof will be omitted.

(Third Embodiment)

Figure 9:
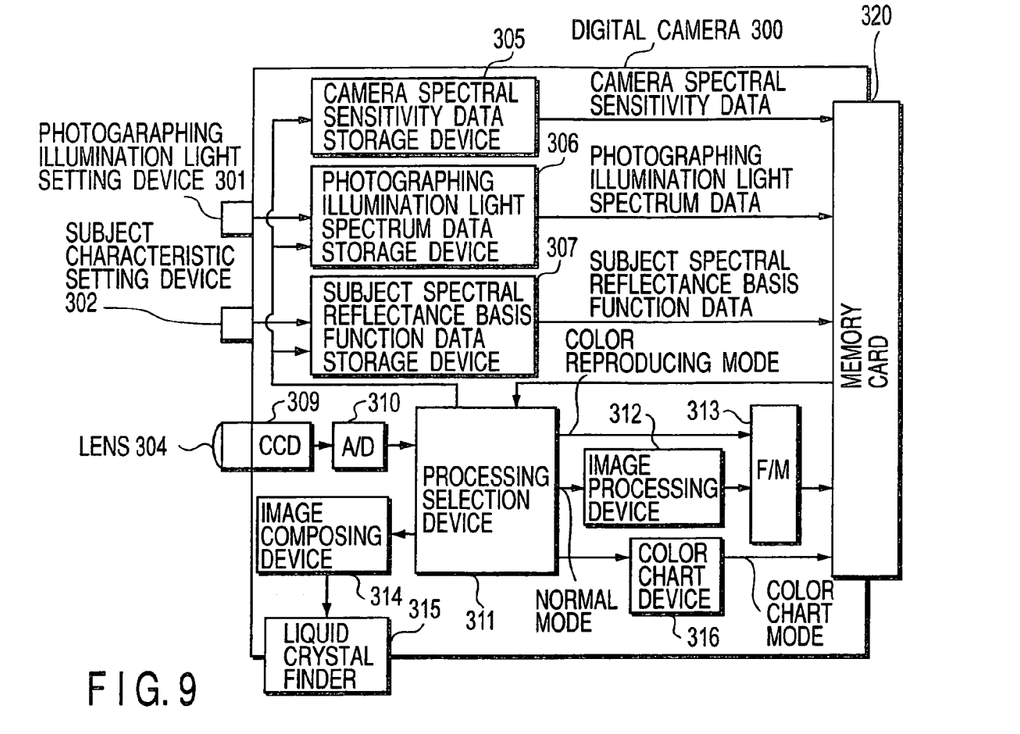
FIG. 9 is a diagram showing a configuration of a digital camera in a color reproducing system according to a third embodiment of the invention.
Figure 10:
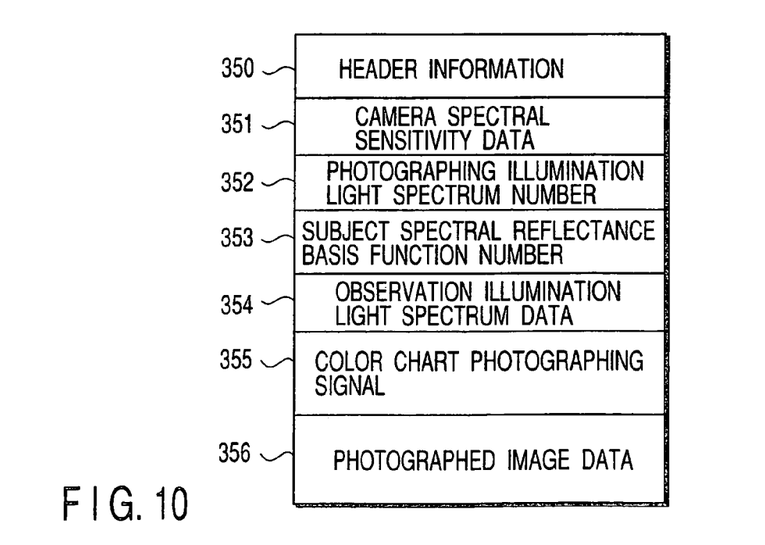
FIG. 10 is a diagram showing a data structure of a memory card in a mode reproducing mode.

FIGS. 9 and 10 show a third embodiment of the color reproducing system of the present invention. The color reproducing system of this embodiment comprises a color chart for calibration, a digital camera, a memory card, a color correction device and a CRT monitor, like the second embodiment. Photographed image data of a subject which has been photographed by the digital camera is stored in the memory card which has been inserted in a camera body prior to photographing.

FIG. 9 shows a configuration of the digital camera. A subject image is formed on a CCD 309 through a lens 304, and, after an analog signal which has been output from the CCD 309 is digitized through an A/D converter (A/D) 310, the digitized signal is input into a processing selection device 311 as photographed image data. In the processing selection device 311, selection of processing is performed on the basis of data regarding mode setting which has been stored in the memory card 320.

The set mode comprises a color reproducing mode, a normal mode and a color chart mode. The color reproducing mode is for exact color reproduction and the normal mode is for desirable color reproduction which has been set in advance. Also, the color chart mode is setting for acquiring calibration data for photographing illumination light and the camera spectral sensitivity, and, after photographing a subject in the color reproducing mode, the mode is automatically changed to the color chart mode.

When the set mode is the normal mode, after a predetermined image processing is performed on photographed image data in the image processing device 312, it is stored in the memory card 320 through a frame memory (F/M) 313. The predetermined image processing performed in the image processing device 312 includes white balance, edge enhancement, saturation enhancement, and gamma correction.

Also, when the set mode is the color reproducing mode, the photographed image data is stored in the memory card 320 through the frame memory 313 without performing the processing on the data in the image processing device 312.

Also, camera spectral sensitivity data, photographing illumination light spectrum number serving as photographing illumination light information, and subject spectral reflectance basis function number serving as spectral characteristic information are respectively read out from a camera spectral sensitivity data storage device 305, from a photographing illumination light spectrum data storage device 306, and from a subject spectral reflectance basis function data storage device 307 to be stored in the memory card 320. Here, the photographing illumination light spectrum data is one which has been selected from a plurality of illumination light spectrum numbers which have been stored in the photographing illumination light spectrum data storage device 306 and has been set by a photographing illumination light setting device 301 in advance.

The photographing illumination light spectrum numbers which have been stored in the photographing illumination light spectrum data storage device 206 are registration numbers of spectrum measurement data pieces of a plurality of light sources including a daylight lamp, a fluorescent lamp, a halogen lamp, and the like. Similarly, the subject spectral reflectance basis function number is one which has been set from a plurality of subject spectral reflectance basis function numbers which have been stored in the subject spectral reflectance basis function data storage device 307 by a subject characteristic setting device 302 in advance. The subject spectral reflectance basis function numbers which have been stored in the subject spectral reflectance basis function data storage device 207 are registration numbers of basis functions of spectral reflectances of a plurality of subjects including a human skin, a color chart, a flower, a picture and the like. When the set mode is the normal mode, photographed image data and related information required according to a format are stored in the memory card 320 in a predetermined format. When the set mode is the color reproducing mode, header information, camera spectral sensitivity data, photographing illumination light spectrum number, and subject spectral reflectance basis function number are stored together with photographed image data in the memory card 320 for each photographed image. When the camera spectral sensitivity data, the photographing illumination light spectrum number and the subject spectral reflectance basis function number are not set, these data are not stored in the memory card 320.

FIG. 10 shows a structure of data which is stored in a memory card in a case of the color reproducing mode, and the structure comprises header information 350, camera spectral sensitivity data 351, photographing illumination light spectrum number 352, subject spectral reflectance basis function number 353, observation illumination light spectrum data 354, color chart photographed signal 355 and photographed image data 356.

Also, when the set mode is the color chart mode, a color chart guide corresponding to a configuration of a color chart is superimposed on a subject image to be displayed on a liquid crystal finder 315. The photographed image data of the color chart is input in a color chart processing device 316. In the color chart processing device 316, respective patches within the color chart are automatically recognized from the photographed image data of the color chart input from the processing selection device 311, and an average value of photographing signals of the respective patches is calculated and stored in the memory card 320. Confirmation about whether or not the automatic recognition of the color chart is performed correctly can be made with eyes by displaying the average region of the signal values on the respective patches of the color chart photographed image on the liquid crystal finder 315.

In the color correction device, XYZ under observation illumination light of the subject is estimated from the photographed image data, the camera spectral sensitivity data, the photographing illumination light spectrum data corresponding to the photographing illumination light spectrum number, and the subject spectral reflectance basis function data corresponding to the subject spectral reflectance basis function number, which are read out from the memory card 320, and observation illumination light spectrum data serving as observation illumination light information which has been stored in the memory card 320 in advance and color matching function data which have been stored in the color correction device in advance, and RGB signal to be input in the CRT monitor is calculated from the estimated XYT and CRT monitor profile data to be output in the CRT monitor for displaying the XYZ of the subject under the observation illumination light on the CRT monitor.

The photographing illumination light spectrum data and the subject spectral reflectance basis function data are stored in the color correction device so as to correspond to their registration numbers. The CRT monitor is input with the RGB signal output from the color correction device to display the color image of the subject. Incidentally, all the spectral characteristic data have data at intervals of 1 nm in the wavelength range of 380 nm to 780 nm.

The configuration and operation of the color correction device 230 have been described in detail in Japanese Patent Application KOKAI Publication No. 11-85952 and therefore explanation thereof will be omitted here. Also, when at least one of camera spectral sensitivity and photographing illumination light spectrum is not stored in a photographed image data file, the color chart photographing signal and the spectral reflectance data of the color chart which has been stored in the color correction device in advance can be used in a substituting manner. Since the configuration and operation of the color correction device in this case have been described in detail in Japanese Patent Application KOKAI Publication No. 11-96333, explanation thereof will be omitted.

Incidentally, in the above embodiments, the camera spectral sensitivity data, the photographing illumination light spectrum data, and the subject spectral reflectance basis function data are stored in a state where they are added to each photographed image data, but the present invention is not limited to this. These data may be given when the color correction processing is performed in the color correction device.

The inventions structured in the following manner are extracted from the above embodiments.

1. An invention is a color reproducing system comprising:
a color image input section;
a color image processing device having an image processing section for performing a predetermined processing on color image data input through the color image input section;
a storage section for storing the color image data input through the color image input section; and
a color image output section for outputting the color image data stored in the storage section, wherein
the color image processing device further comprises a processing selection section for selecting whether or not the predetermined processing is performed on the color image data input through the color image input section.

(Corresponding Embodiments of the Invention)
The first embodiment (FIGS. 1 to 3), the second embodiment (FIGS. 4 to 8G) and the third embodiment (FIGS. 9 to 10) correspond to this invention.

The color image input section includes 100, 200 or 300 of the digital camera, the CCD 109, 209 or 309, the A/D converter 110, 210 or 310, the camera spectral sensitivity data storage device 105, 205 or 305, the photographing illumination light spectrum data storage device 106, 206 or 306, and the subject spectral reflectance basis function data storage device 107, 207 or 307; the image processing section includes the image processing device 112, 212 or 312; the color image processing device includes the processing selection device 111, 211 or 311, and the image processing device 112, 212 or 312; the storage section includes the memory card 120, 220 or 320; the color image output section includes the CRT monitor 140 or 240; and the processing selection section includes the processing selection device 111, 211 or 311.

(Effect)
Selection about whether or not the predetermined image processing is performed on input color image data can be made according to an aspect of a color reproducing processing. Here, since selection between the color reproducing mode and the normal mode can be made, one of an image for performing more exact color reproduction and an image on which a desirable color reproducing processing has been performed can be selected by one color image input section.

2. Another invention is a color reproducing system according to the above invention 1, wherein the processing selection section has a setting section for performing a setting about whether or not the predetermined processing is performed at a time when color image data is input through the color image input section.

(Corresponding Embodiments of the Present Invention)
The above first embodiment (FIGS. 1 to 3) corresponds to this invention. The setting section includes the color reproducing mode setting device 103 in the first embodiment.

(Effect)
The setting section is provided in the color image input section, so that one of an image for performing exact color reproduction and an image on which a desirable color reproducing processing has been performed can be selected for each photographing at a time of image input.

3. Another invention is a color reproducing system according to the above invention 1, wherein the storage section stores data regarding mode setting therein, and the processing selection means determines whether or not the predetermined processing is performed on the basis of the data regarding the mode setting which has been stored in the storage section.

4. Another invention is a color reproducing system according to any one of the above inventions 1 to 3, wherein the storage section is a memory card.

(Corresponding Embodiments of the Present Invention)
The above second embodiment (FIGS. 4 to 8G) and third embodiment (FIGS. 9 to 10) correspond to this invention. The color image input section includes the CCD 209 or 309, the A/D converter 210 or 310, the camera spectral sensitivity data storage device 205 or 305, the photographing illumination light spectrum data storage device 206 or 306, and the subject spectral reflectance basis function data storage device 207 or 307 of the digital camera 200 or 300 in the second or third embodiment; the image processing section includes the image processing device 212 or 312; the color image processing device includes the processing selection device 211 or 311 and the image processing device 212 or 312; the storage section includes the memory card 220 or 320; the color image output section includes the CRT monitor 240; and the processing selection section includes the processing selection device 211 or 311.

(Effect)

Since selection of the color reproducing mode or the normal mode is automatically determined on the basis of the data regarding the mode setting which has been stored in the memory card which has been inserted into the digital camera, after a photographer inserts the memory card in the camera, he/she can conduct photographing without considering the mode setting. Also, in many cases, in a camera where a desirable color reproduction is performed, photographed image data for exact color reproduction can be taken out without a special structure of such a color reproducing mode setting function for exact color reproduction.

5. Another invention is a color reproducing system according to any one of the above inventions 1 to 4, wherein the storage section stores spectral characteristic information of a subject therein.

6. Another invention is a color reproducing system according to the above invention 4, wherein the memory card stores spectral characteristic information of a subject corresponding to the kind of the subject.

7. Another invention is a color reproducing system according to the above invention 5, wherein the color image input section further comprises a subject characteristic setting section for setting spectral characteristic information of the subject.

(Corresponding Embodiments of the Invention)

The first embodiment (FIGS. 1 to 3), the second embodiment (FIGS. 4 to 8G) and the third embodiment (FIGS. 9 to 10) correspond to this invention. The subject characteristic setting section includes the subject characteristic setting device 102, 201 or 302 in the first, second or third embodiment.

(Effect)

Since the subject spectral reflectance basis function data is stored together with the photographed image data, even when the subject spectral reflectance basis function data can not be obtained in the color correction device, the color correction processing can be performed. Also, it is made possible to perform the color reproduction in the color correction device more exactly by changing the subject spectral reflectance basis function data for each subject to be photographed. Also, the subject spectral reflectance basis function data corresponding to the kind of a subject is stored in the memory card in advance, so that it becomes unnecessary to store the subject spectral reflectance basis function data in the camera or the amount of data can be reduced.

8. Another invention is a color reproducing system according to any one of the above inventions 1 to 7, wherein the storage section further stores photographing illumination light information therein.

9. Another invention is a color reproducing system according to the above invention 8, wherein the color image input section further comprises photographing illumination light setting means for setting the photographing illumination light information.

(Corresponding Embodiments of the Invention)

The first embodiment (FIGS. 1 to 3), the second embodiment (FIGS. 4 to 8G) and the third embodiment (FIGS. 9 to 10) correspond to this invention. The photographing illumination light setting section includes the photographing illumination light setting device 101, 201 or 301 in the first, second or third embodiment. Incidentally, when photographed image data of the color chart can be obtained, photographing of the color chart is performed in the photographing illumination light setting section.

(Effect)

Since the photographing illumination light spectrum data is stored together with the photographed image data, even when the photographing illumination light spectrum data can not be obtained in the color correction device, the color correction processing can be performed. Also, it is made possible to perform the color reproduction in the color correction device more correctly by changing the photographing illumination light spectrum data for each illumination condition for photographing.

10. Another invention is a reproducing system according to any one of the above inventions 1 to 9, wherein the processing selection section has a photographing mode of a color chart for calibration, and the color image input section has a finder, the finder displaying a frame for color chart photographing in the photographing mode of a color chart for calibration.

(Corresponding Embodiments of the Invention)

The second embodiment (FIGS. 4 to 8G) and the third embodiment (FIGS. 9 to 10) correspond to this invention. In the second or third embodiment, the photographing mode of a color chart for calibration includes the color chart mode, the finder includes the liquid crystal finder 215 or 315, and the frame for color chart photographing includes the color chart guide 1 or 2, respectively.

(Effect)

Since the frame for color chart photographing is displayed in the finder at the time of photographing the color chart for calibration and the color chart is arranged and photographed so as to match with the frame for color chart photographing, the color chart can be photographed with its exact arrangement. Also, it becomes easy to recognize positions of respective patches constituting the color chart from the photographed image data of the color chart to calculate the photographing signal value automatically.

11. Another invention is a color reproducing system according to any one of the above inventions 1 to 10, wherein the predetermined processing performed in the image processing section includes at least one of white balance, edge enhancement, saturation enhancement, gamma correction, and color correction for desirable color reproduction.

(Corresponding Embodiment of the Invention)

The first embodiment (FIGS. 1 to 3), the second embodiment (FIGS. 4 to 8G) and the third embodiment (FIGS. 9 to 10) correspond to this invention.

(Effect)

Since such a processing as white balance, edge enhancement, saturation enhancement, gamma correction, and color correction for desirable color reproduction, which makes it difficult or impossible to recover the image data before the processing by a reverse correction can be prevented at the color reproducing mode time, exact color reproduction can be performed with a high accuracy in the following color correction device.

12. Another invention is a color reproducing system according to any one of the above inventions 1 to 11, wherein the storage section further stores observation illumination light information therein.

(Corresponding Embodiment of the Invention)

The above third embodiment (FIGS. 9 to 10) corresponds to this invention.

(Effect)

Since the observation illumination light information is stored in the storage section, it becomes unnecessary to give the observation illumination light information at the color reproducing mode time.

According to the present invention, there is provided a color reproducing system which can make selection about whether a predetermined processing is performed on input color image data according to an aspect of a color reproduction processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color reproducing system comprising:
   color image input means; and
   a color correction device, which performs color correction processing by using a color chart image and signal values of a plurality of patches that have been automatically recognized from the color chart image, the color chart image being formed of the plurality of patches input by photographing a color chart by the color image input means.

2. The color reproducing system according to claim 1, wherein the color image input means displays a color chart guide and photographs the color chart along with the color chart guide.

3. The color reproducing system according to claim 1, further comprising storage means for storing color image data input by the color image input means, wherein the color chart image is stored in the storage means in a file which stores data of a photographed subject image.

4. The color reproducing system according to claim 3, wherein the color chart image and the subject image are photographed under same illumination light.

5. The color reproducing system according to claim 1, wherein the color correction device is adapted to automatically recognize the plurality of patches of the color chart image.

6. The color reproducing system according to claim 1, wherein the color correction device is adapted to automatically locate, within an input color image, the plurality of patches of the color chart image.

7. A color reproducing system comprising:
   color image input means; and
   a color correction device, which performs color correction processing by using a color chart image obtained by photographing and inputting a color chart formed of a plurality of patches by the color image input means, and signal values of the plurality of patches from the color chart image,
   wherein the color image input means displays a color chart guide and photographs the color chart along with the color chart guide.

8. The color reproducing system according to claim 7, wherein the color chart guide allows a user to define a position of the color chart within a color image.

9. The color reproducing system according to claim 7, wherein the color chart guide allows a user to input accurately a position of the color chart within a color image.

* * * * *